United States Patent

Nunez et al.

[11] Patent Number: 5,468,456
[45] Date of Patent: Nov. 21, 1995

[54] BATCH EXTRACTING PROCESS USING MAGNETICPARTICLE HELD SOLVENTS

[75] Inventors: Luis Nunez, Elmhurst; George F. Vandergrift, Bolingbrook, both of Ill.

[73] Assignee: The University of Chicago, Chicago, Ill.

[21] Appl. No.: 191,643

[22] Filed: Feb. 4, 1994

[51] Int. Cl.$^6$ .......................... B01D 11/00; C01G 56/00; C01G 57/00; C22B 60/02
[52] U.S. Cl. .................... 423/10; 423/9; 423/25; 376/313; 376/315
[58] Field of Search .................... 423/10, 9, 25; 210/634, 222, 688, 699, 700; 428/402; 376/313, 315

[56] References Cited

U.S. PATENT DOCUMENTS

| | | | |
|---|---|---|---|
| 4,324,767 | 4/1982 | Dines | 423/3 |
| 4,548,790 | 10/1985 | Horwitz et al. | 423/9 |
| 4,574,072 | 3/1986 | Horwitz et al. | 423/9 |
| 4,612,247 | 9/1986 | Walsh et al. | 428/402 |
| 4,786,481 | 11/1988 | Kataoka at al. | 423/7 |
| 4,797,264 | 1/1989 | Inoue et al. | 423/7 |
| 5,043,070 | 8/1991 | Hwang | 210/634 |
| 5,322,644 | 6/1994 | Dunn et al. | 252/626 |

*Primary Examiner*—Donald P. Walsh
*Assistant Examiner*—Meena Chelliah
*Attorney, Agent, or Firm*—Emrich & Dithmar

[57] ABSTRACT

A process for selectively removing metal values which may include catalytic values from a mixture containing same, wherein a magnetic particle is contacted with a liquid solvent which selectively dissolves the metal values to absorb the liquid solvent onto the magnetic particle. Thereafter the solvent-containing magnetic particles are contacted with a mixture containing the heavy metal values to transfer metal values into the solvent carried by the magnetic particles, and then magnetically separating the magnetic particles. Ion exchange resins may be used for selective solvents.

20 Claims, 5 Drawing Sheets

BATCH EXTRACTING PROCESS USING MAGNETICPARTICLE HELD SOLVENTS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

The Efficient Separation Processes Integrated Program (ESPIP) has been created by the U.S. Department of Energy (DOE) to develop and integrate processes for remediation efforts. Under the program, promising technologies are developed for application to the separation and concentration of radionuclides and hazardous components; however, this invention pertains to a greater variety of materials and includes separation of many different metals from solutions containing same.

Among the major radioactive waste problems is the Hanford underground tank site that currently has many underground storage tanks containing high-level waste (HLW). These tanks have a wide variety of problems. Processing of nuclear materials for the national defense over the last 40 years has left the tanks filled with highly active nuclear waste, and some of them pose immediate safety concerns. The tank wastes pose particularly complex problems because they are inhomogeneous: the tank can be categorized in these type's; saltcake, supernatant, and sludge. The sludge is the most difficult to treat because of its complexity and multiple phases.

The major radionuclides of concern are $^{137}$Cs, $^{90}$Sr, and TRU elements. These contaminants must be removed before the bulk of the waste can be disposed of as low level waste. The use of current technologies to process these tank wastes would present two major problems. First, the quantity of glass produced would exceed Hanford's goal, set under its "Clean Option Strategy" for pretreatment, of producing fewer than 1000 canisters of glass to contain these radionuclides for deposit in a deep geologic repository. Second, a rather complex pretreatment facility is being planned to meet clean option goals, but this facility is still decades away from completion. Means to begin early processing of tank wastes are needed much sooner to start process of final disposal for the wastes. The complexity of the regulator issues can delay cleanup when such activities are involved. The problems could be addressed by the development of modular processes and compact operating units that provide adequate decontamination without requiring the construction of complex facilities.

The broader application of this technology is the recovery of soluble metals and the decontamination of process and natural waters from radionuclides and toxic metals using this compact, transportable technology.

SUMMARY OF THE INVENTION

Accordingly, an object of the invention is to provide a process which combines the selective and efficient separation afforded by chemical sorption with magnetic recovery of the extractant. Another object is to develop an in-tank, or near-tank processes for removal of contaminants from solution, a simple, compact, cost-effective process that does not produce large secondary waste streams.

Still another object of the invention is to provide a method applicable to a wide variety of metals for separating same using either or both of a solvent or an ion exchange material absorbed onto a magnetic particle which is thereafter used to separate the selected metal(s) from its environment.

Furthermore, the invention is envisioned to apply for the efficient delivery and recovery of organic or inorganic reactants such as catalytic reagents for aqueous and non-aqueous reaction. For example, both water soluble and water insoluble rhodium metallophthalorganics complexes, Pt, Pd, Cu, Ni, Ti and their inorganic and organic complexes.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
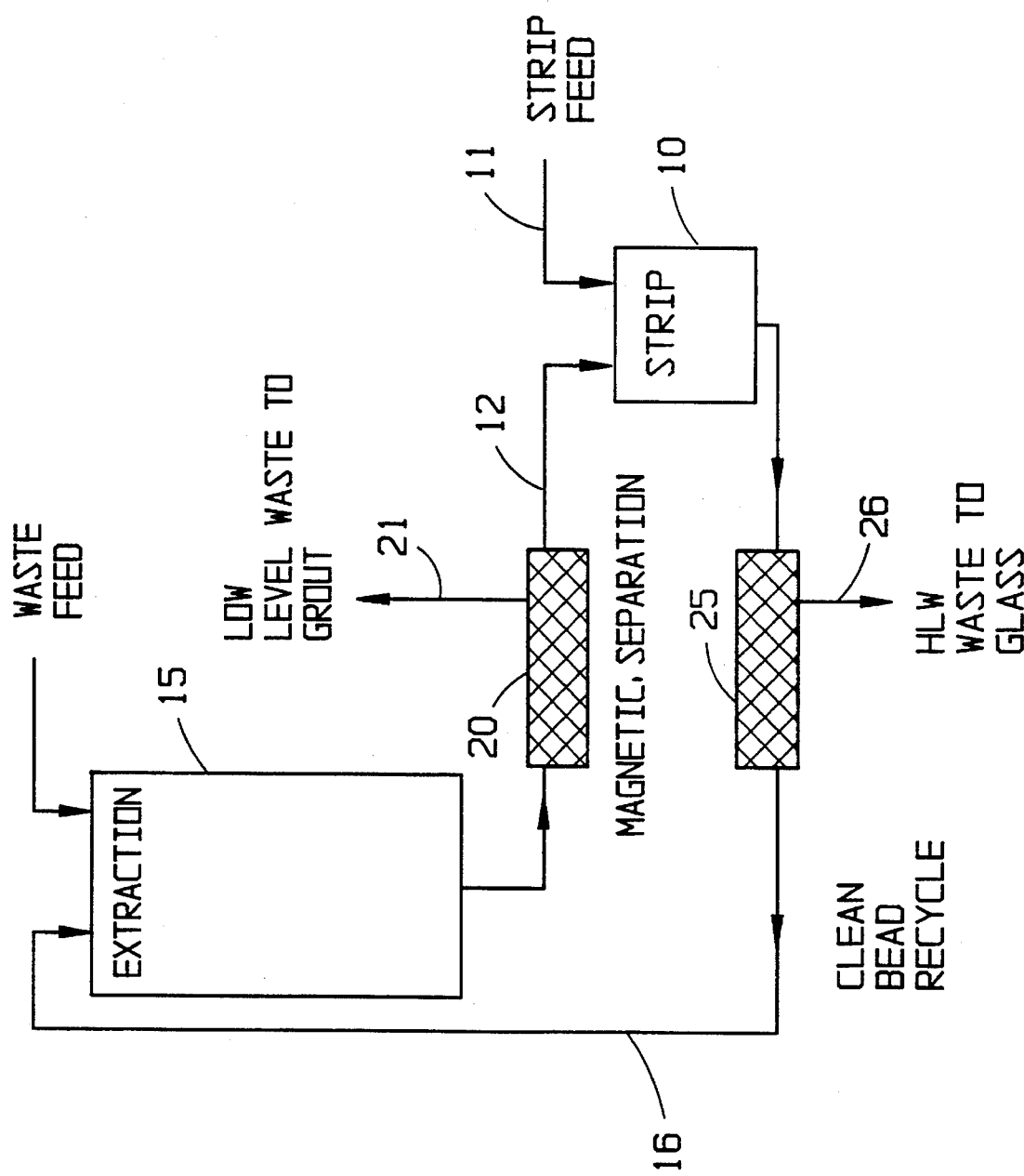
FIG. 1 is a schematic diagram of the inventive process.

Referring to FIG. 1, the dissolved sludge stream is added to a tank 10 through a line 11, the tank 10 may be used active both for treatment and for stripping. Magnetic particles coated with extractants are added to the tank 10 through line 12 to separate the TRU and/or other contaminants from the dissolved sludge or aqueous solution. To maintain particle suspension, the tank 10 contents can be mixed by mechanical stirring or other well known methods (not shown). After extraction, the particles are transferred to extraction tank 15 through line 16 and magnetically separated at separator 20 by one of three methods: 1) placing a magnetic field around the treatment tank, 2) pumping the solution through a magnetic filter, or 3) introducing a magnet inside the tank. The waste solution now decontaminated is withdrawn and can be sent to grout or other treatment via line 21. The TRU-loaded particles are left in the tank 10 for stripping with a smaller volume of liquid compared to the original feed volume. Complex solvent solutions, such as the TRUEX and TRUEX/SREX solvents, can be sorbed on porous and nonporous resin beads or spheres by dissolving the solvent with a volatile diluent ($C_5$–$C_8$ hydrocarbons or alcohols) and stirred with the beads as the diluent is evaporated by heat and a vacuum.

After the beads are "dry", they are ready to be contacted with the aqueous waste solutions. After the beads have equilibrated with the solution by vigorous stirring in the tank, they can be separated from the solution by several methods depending on the character of the beads. If the beads are less dense than the solution, they can be skimmed from the top of the liquid and filtered. If the beads and the solution are near the same density, the suspension can be removed from the tank and filtered to recover the beads. If the beads are given a ferromagnetic or paramagnetic core, a magnet can be lowered into the tank so that the beads will agglomerate onto it and be removed as the magnet is withdrawn.

The TRU elements can be stripped from the beads by addition of the volatile diluent (preferably a water-immiscible alcohol) that will act to dilute the CMPO (and the crown ether in the case of SREX) and cause the distribution ratios to be greatly lowered so that the alcoholic solution, the volatile solvent can be evaporated to dryness, and the beads are ready for recycle. The concentration of the CMPO can be higher on the beads than the typical TRUEX solvent composition of 0.2M, because stripping is accomplished by dilution with alcohol.

The beads can also be used in the standard chromatographic mode for recovering TRU elements from waste solution passing through the column. The unique feature of this invention of washing the TRUEX solvent from the beads for effective stripping would still apply in this application. By using the Alcoholic strip the volume of the stripping solution would be greatly reduced over the current column stripping technique. The TRU contaminants are separated from the magnetic particles and sent to glass from a separator 25 via line 26, while the particles are recycled for further extraction.

The inventive process is intended to 1) reduce the complexity of equipment, compared with solvent extraction and ion exchange for metal separation in processes, 2) facilitate scale-up because of its simplicity, and 3) aid in the delivery and recovery of reagents with solution for reaction or catalytic purposes. One of the Hanford tank wastes that the inventive process can successfully treat is the waste from the neutralized Plutonium Finishing Plant (PFP) in Hanford. The Hanford Site currently has many tanks filled with PFP wastes, with each tank containing approximately one million gallons. The greatest benefit of the invention as applied to radioactive waste is that radionuclides are separated from waste streams by a simple, compact, and cost-effective process that does not produce large secondary waste streams.

In the inventive process, magnetic particles coated with octyl(phenyl)-N,N-diisobutylcarbamoylmethylphosphine oxide (CMPO), the solvent currently used in the TRUEX process, are utilized, see U.S. Pat. No. 4,548,790 issued Oct. 22, 1985 and U.S. Pat. No. 4,574,072 issued Mar. 4, 1986, both to Horwitz et al., the disclosures of which are herein incorporated by reference. These particles are used to remove TRU elements from solutions generated by dissolving Hanford tank sludge. CMPO has high selectivity and extracting power for actinides; a vast background of data, experience, and understanding is available on the TRUEX solvent and process; and this solvent has been absorbed onto a solid particle to prepare chromatographic material. Heretofore, no one has used CMPO absorbed onto magnetic particles selectively to remove TRUs from solution. For other application the solvent on the particles will change.

Because the coated particles are used in a batch mode, distribution ratios and solvent loading of TRU elements should be as high as possible, but mass transport should not limit the effectiveness of separation. Increasing the concentration of CMPO will increase distribution ratios and loading; however, it is also likely to increase solvent viscosity and its propensity to separate into two phases, lowering mass transfer. In the standard TRUEX solvent, 1.4M tributyl phosphate (TBP) acts as a solvent modifier and a hydrocarbon acts as the diluent. For this invention, we use TBP as a diluent.

Initial tests have been performed with simulants, and later tests will be performed on actual dissolved sludge. Out of the many tanks and waste compositions at Hanford, the invention is focusing primarily on the tanks of waste that originated from the PFP. This waste has very small concentrations of lanthanides (which are also extracted by CMPO) and can cause solvent loading and therefore a low extractability of TRU elements) and is appropriate for treatment using the inventive process. Table 1 shows the non-TRU composition of these tanks.

TABLE 1

| PFP Waste Simulant Composition | | |
| --- | --- | --- |
| Component | Component Charge | Conc. (mol/L) |
| H | 1 | 1.5 E 00 |
| Be | 2 | 7.0 E-05 |
| Na | 1 | 4.0 E-02 |
| Mg | 2 | 6.0 E-02 |
| Al | 3 | 4.3 E-01 |
| K | 1 | 3.0 E-03 |
| Ca | 2 | 6.0 E-02 |
| Cr | 3 | 4.0 E-04 |
| Mn | 2 | 3.0 E-03 |
| Fe | 3 | 3.0 E-02 |
| Ni | 2 | 8.0 E-02 |
| Cu | 2 | 3.0 E-04 |
| Zn | 2 | 6.0 E-04 |
| Pb | 2 | 5.0 E-04 |
| F | −1 | 9.0 E-02 |
| $SO_4$ | −2 | 1.0 E-02 |
| $NO_3$ | −1 | 3.05 E-00 |

The particles acquire their ferromagnetic properties from magnetite ($Fe_3O_4$) being incorporated in their structure. The particles vary in size from 0.1 to 25 μm, and possess a wide range of shapes. The commercially purchased particles from the Cortex Company came with a passive coating (polymeric coating). The passive coating that demonstrated the most promise for CMPO/TBP adsorption was charcoal in a cross-linked N, N-methylene bis-acrylamide. The particles were washed with 0.02-μm filtered water several times to eliminate preservatives and additives, then were dried and weighed. Then, 0.02-μm filtered hexane or ethanol was used to disperse the particles and act as a volatile solvent for the coating. Other alcohols, and particularly the long chain alcohols such as butyl or octyl may be substituted for hexane or ethanol. CMPO/TBP was added to the mixture and the particles were dispersed by an ultrasonic bath and finally dried in a rotoevaporator at 80°–100° C. until constant weight obtained. Active coating thicknesses were calculated and prepared with a wide range of CMPO/TBP concentrations tabulated in Table 2.

Particle suspensions of approximately 1 wt % or less were contacted with nitric acid solutions containing $^{241}$Am or $^{238}$Pu. This low particle mass to solution ratio chosen allows the process to compete with more traditional separation techniques such as solvent extraction and ion exchange. The suspensions were held in a sonic cleaning bath to enhance the dispersion, placed in a temperature bath at 25° C. for thermal equilibrium, and agitated with a vortex mixer to further disperse the solid suspension. This procedure was repeated two times, then the mixtures were centrifuged and placed in a rare-earth permanent magnet rack to cause separation. The supernatant was withdrawn from solution, and an aliquot was used for liquid scintillation ($^{238}$Pu) or gamma counting ($^{241}$Am). Mass balance calculations were used to determine $K_d$ values.

The radionuclide-loaded magnetic particles were dried in preparation for stripping experiments. Fresh stripping agent was added and contacted following a procedure similar to that used in the extraction experiments. The volume of stripping agent was one-tenth the aqueous phase volume used for extraction experiments.

The TRU elements can be stripped from the beads by addition of the volatile diluent [preferably a hydrocarbon (e.g., hexane, heptane) or a water immiscible alcohol] (e.g. octanol) that will dilute the CMPO (and the crown ether in the case SREX) and cause the distribution ratios to be greatly lowered so that the CMPO solution can be contacted by an aqueous stripping solution at a low organic-to-aqueous ratio to concentrate the TRU as it is stripped. After the TRU is recovered from the diluted CMPO solution, the volatile solvent can be evaporated to dryness, and the beads are ready for recycle. The concentration of the CMPO can be higher on the beads than the typical TRUEX solvent composition of 0.2M because stripping is accomplished by dilution with a volatile hydrocarbon or alcohol.

To determine their effectiveness of TRU separation, the CMPO/TBP composition was fixed, and three samples of varying calculated thicknesses were formulated and tested. High CMPO concentrations were initially studied (at 2M HNO$_3$ with $^{241}$Am tracer) because the inventive technology is intended to be used for batch processing. The molar concentrations of CMPO were varied between 1 and 1.5M diluted in TBP. The partition coefficients ($K_d$) are set forth in Table 2.

TABLE 2

Dependency on $K_d$ on Coating Thickness and Composition

| CMPO (M) | Calculated Thickness [µm] | Kd (g/mL) |
| --- | --- | --- |
| 1 | 0.6 | 830 |
| 1 | 0.8 | 1400 |
| 1 | 1 | 2470 |
| 1.36 | 1 | 500 |
| 1.36 | 1.2 | 860 |
| 1.36 | 1.4 | 1100 |
| 1.5 | 0.45 | 2830 |
| 1.5 | 0.56 | 2400 |
| 1.5 | 0.65 | 2660 |

Figure 2:
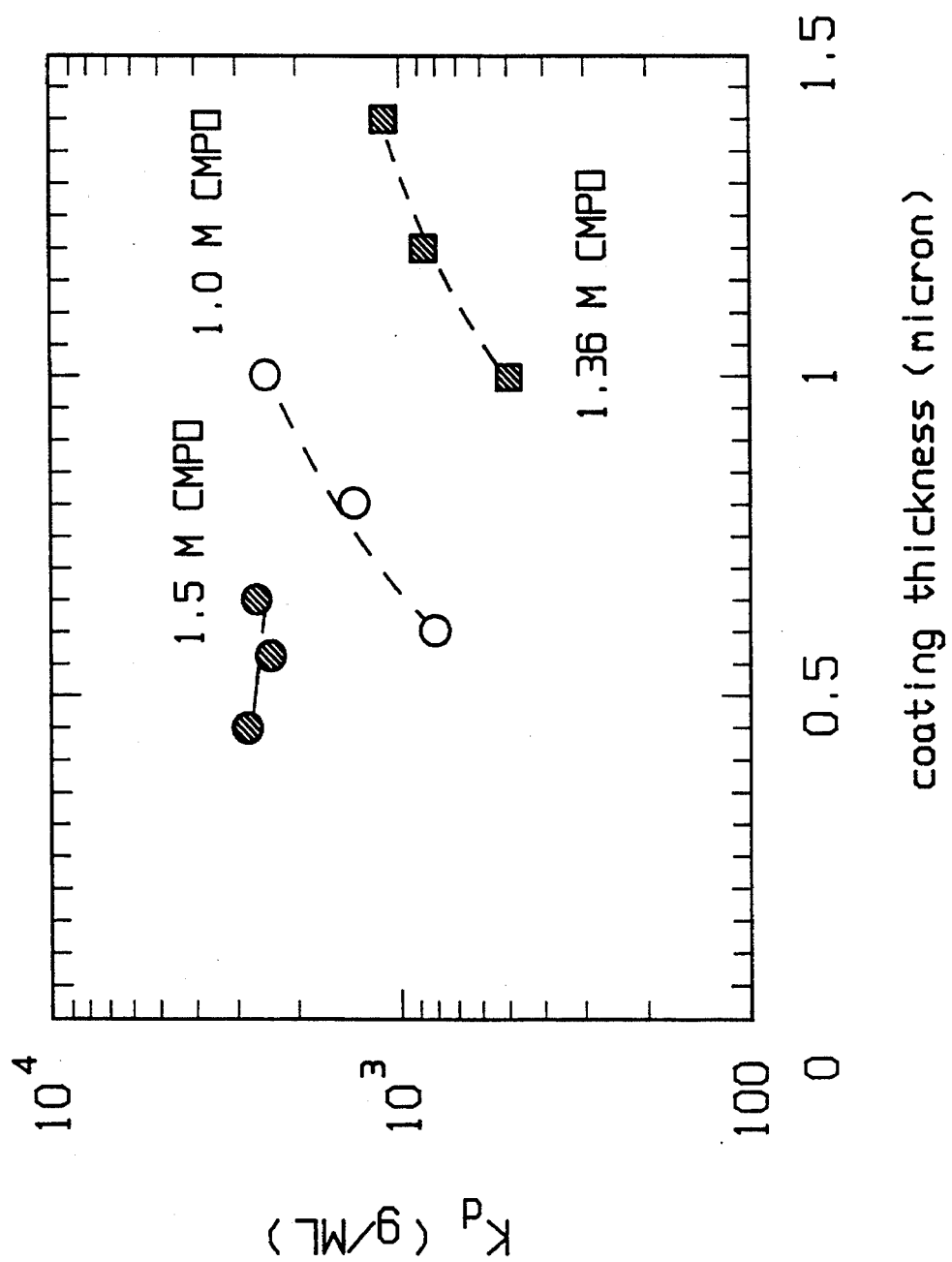
FIG. 2 is a graphical representation of a plot of dependence of $K_d$ on calculated coating thickness for $^{241}$Am.

The 1.0 and 1.5M CMPO samples were prepared in hexane, while the 1.36M CMPO samples were coated by using ethanol as the carrier diluent. Both the 1.0 and 1.35M data sets follow the trend of increasing $K_d$ with increasing coating thickness. FIG. 2 illustrates the variation of $K_d$ as a function of coating thickness for various CMPO concentrations. The data show that as the concentration of CMPO increases, the change in $K_d$ as a function of coating thickness decreases, if saturation or loading effects is negligible. For a CMPO concentration of 1.5M, the curve reaches a plateau. This can be explained by high CMPO concentration reducing diffusion because of the high coating viscosity. Further increase in coating thicknesses is limited by particle adsorption capacity. All of the CMPO/TBP concentrations used in these examples have given larger $K_d$ for Am and Pu than expected from CMPO concentration dependence (e.g., TRUEX process). For plutonium extraction, this effect can be partially attributed to TBP extraction, while for americium, no TBP extraction effects were expected. Since the volatile solvent should have completely evaporated during the coating process, $K_d$ should be independent of the solvent used. A comparison of the ethanol and the hexane data shows that the magnitude of the $K_d$ values for the 1.36M CMPO with ethanol fall outside the range observed for the 1.5 and 1.0M CMPO with hexane (FIG. 2). On the basis of recent coating analyses, this discrepancy may be due to differences in the 1.36M coating process.

The nitric acid dependency of the inventive process is important for the application of this process to wastes having a wide range of acidities. The partition coefficients for various coatings were monitored using $^{241}$Am and $^{238}$Pu tracers. Samples were tested in 2M, 5M and 8M nitric acid with CMPO concentrations of 1.0 and 1.5M. The results are presented in FIG. 3. With increased nitric acid concentrations, the $K_d$ values decreased for all the CMPO/TBP concentrations, as shown in FIG. 3.

Figure 3:
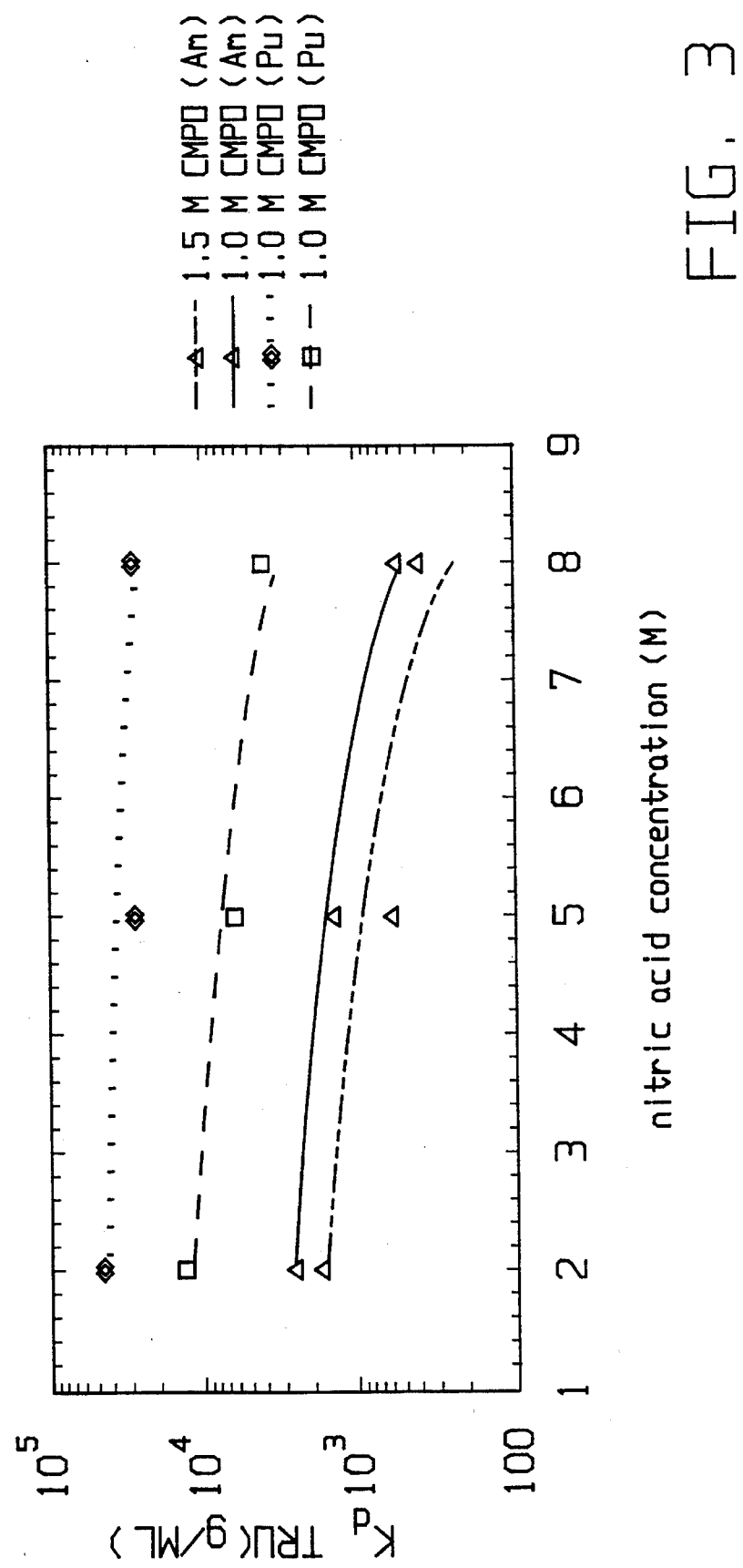
FIG. 3 is a graphical representation of $K_d$ dependence on nitric acid concentration for $^{241}$Am and $^{238}$Pu for CMPO/TBP coatings on magnetic particles.

FIG. 3 shows that the four curves have similar shapes. The $K_d$ values for both Am and Pu decrease slowly over the entire range of nitric acid concentrations, but they all fall between 400 and 3000 for americium and between 3900 and 46,000 for plutonium. This result suggests that the process can be applied in a batch mode for a wide range of high nitric acid concentrations without a large loss in extraction capabilities.

Figure 4:
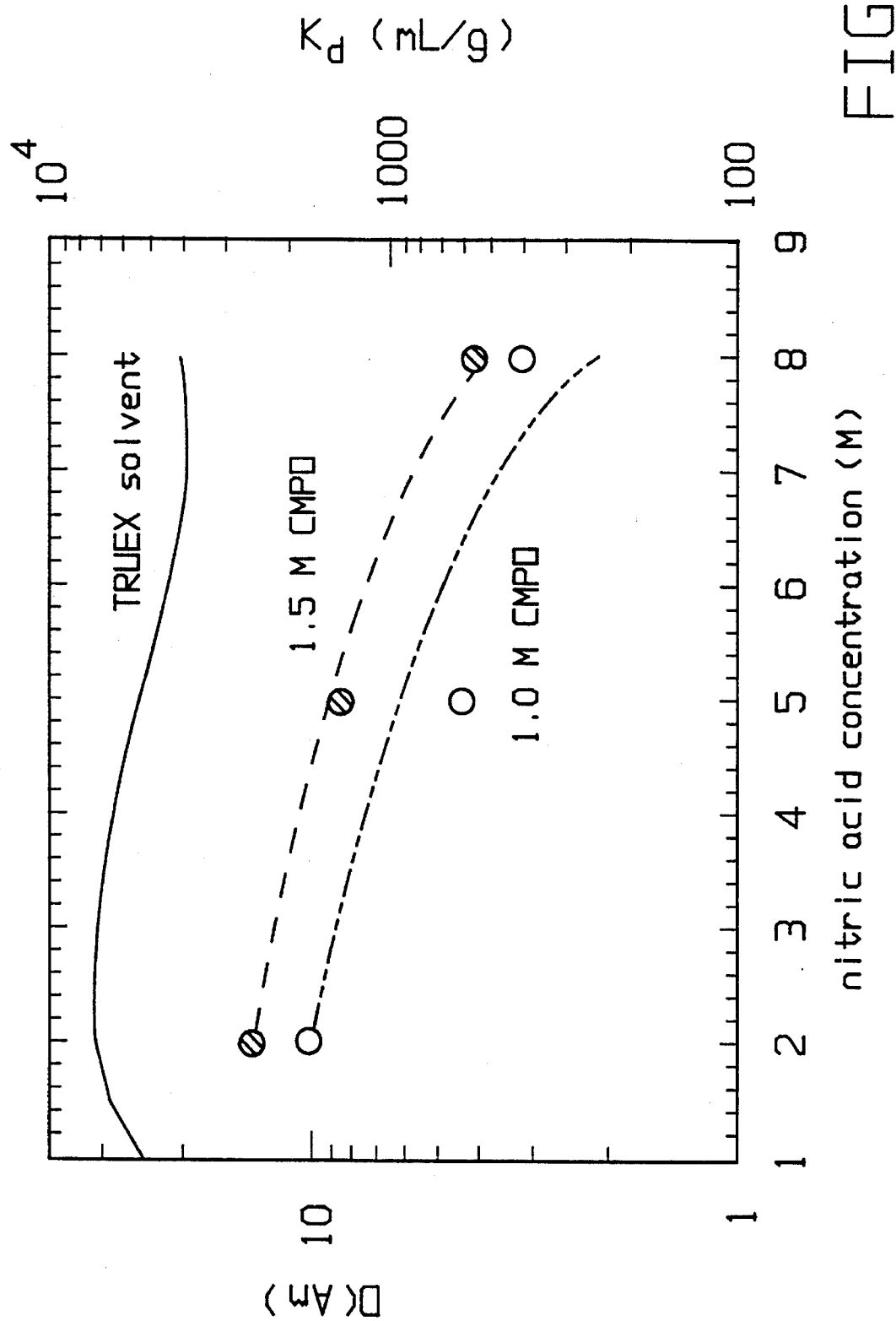
FIG. 4 is a graphical comparison of americium distribution ratios in TRUEX solution and $K_d$ for CMPO coated absorbed magnetic particles in nitric acid solutions.

The two $K_d$ data sets for americium to the distribution ratio (D) derived from americium solvent extraction chemistry in TRUEX-NPH (normal paraffinic hydrocarbon) were compared. A smooth curve describing the D values for americium in nitric acid solutions was generated from the Generic TRUEX Model (GTM) for nitric acid concentrations between 1 and 8M. FIG. 4 combines the data from the GTM with the data in FIG. 3. The plot shows that americium follows the expected trends for the TRUEX process for the acid concentration range investigated.

In these examples, plutonium tended to show slightly decreased $K_d$ with increased nitric acid concentration (FIG. 3). This trend disagrees with the distribution ratios obtained for plutonium by the GTM, where $D_{Pu}$ increases with increasing nitric acid concentrations.

Because the $K_d$ values obtained using magnetic particles are quite large, an efficient recovery stage is required. The usual stripping process for nitrate waste streams involves the use of dilute nitric acid for americium and aqueous phase complexant or reducing agent for plutonium. However, because the subject process results in large $K_d$ values due to the high concentration of CMPO, dilute nitric acid would be inefficient for stripping americium. A three step process for stripping is necessary. In the first step CMPO and TBP alone with the TRU elements are stripped from the particles by using a hydrocarbon or an alcohol. In the second step, the TRU are stripped from the organic phase, which is now a dilute CMPO solution, by an appropriate aqueous phase. In the third step the volatile hydrocarbon or alcohol is evaporated leaving the CMPO/TBP residual on the particle surface. A solvent waste step to remove hydrolytic and radiolytic degradation products of CMPO and TBP, may also be required. Contact with a sodium carbonate solution and/or running the solution through an alumina column is the normal practice for TRUEX solvent.

Table 3 gives the stripping $K_d$ values for plutonium for the first step of the stripping sequence, the CMPO dissolution from the particles. The values were derived from the mass balance equation (Eq. 1), with the assumption that there is negligible loss in particle mass before and after stripping:

$$K_d^{strip} = \frac{\left[\left(\frac{g_p}{V}\right) K_d^{ext} C_{final}^{ext} - C_{final}^{strip}\right]}{\left(\frac{g_p}{V}\right) C_{final}^{strip}}$$

Where $g_p$ is the mass of the particles; V is the volume of waste solution; $_{final}^{strip}$ and $_{final}^{ext}$ are the final concentrations after stripping and extraction, respectively; and $K_d^{ext}$ is the extraction partition coefficient.

TABLE 3

Stripping $K_d$ for $^{238}$Pu in PFP Simulant

| Sample | Stripping Solvent | $K_d$ Loading | $K_d$ Stripping |
|---|---|---|---|
| 1.2M CMPO | ethanol | 191 | 4.5 |
| 1.0M CMPO | butyl alcohol | 332 | 4.8 |
| 1.0M CMPO | ethanol | 155 | 0.7 |

These stripping tests showed a large reduction in $K_d$ values. Other stripping tests gave negative $K_d$ stripping values, which qualitatively indicates that stripping efficiently removed the TRU elements and CMPO from the particles. The negative values, can be attributed to errors in the assumption in the mass balance equation. In addition, we were able to easily reduce the volume by a factor of 10 in many cases.

The $K_d$ values obtained for TRU material from the inventive process are large. Unfortunately, the waste streams from many of the Hanford SST's contain large concentrations of lanthanides and other elements that may compete with the extraction of americium. Lanthanide loading of the CMPO can occur, and difficulty in the TRU separation can be expected when lanthanide concentrations are high. If sludges from all the tanks are combined then an average waste composition (1) can be obtained (see Table 4). A high lanthanide concentration in the combined sludge could interfere with the in situ processing.

TABLE 4

Composition of the Simulated Dissolved Sludge from all the Hanford SSTs.

| Component | Conc. (mol/L) |
|---|---|
| Fe | 1.72 E-01 |
| Na | 7.08 E-02 |
| Ca | 4.91 E-02 |
| Mn | 4.29 E-02 |
| Cr | 3.77 E-02 |
| Bi | 1.79 E-02 |
| Zr | 1.30 E-02 |
| Eu | 9.67 E-03 |
| Sr | 6.53 E-03 |
| Ag | 5.61 E-03 |
| Ba | 5.32 E-03 |
| Zn | 2.46 E-03 |
| Mg | 1.58 E-03 |
| Co | 7.21 E-04 |
| Cd | 5.94 E-04 |
| Pb | 5.21 E-04 |

To monitor loading effects, we studied TRU separation from PFP and SST simulated waste solutions (characterized in Table 1 and Table 4, respectively) spiked with TRU tracer. Table 5 shows the values of $K_d$ measured in the simulant solutions. For the PFP waste the average $K_d$ values for Am and Pu are close to 100 and 3000, respectively. Because the concentrations of lanthanides and other interfering elements are negligible, TRU elements can be separated from the PFP feed stream. The low Kd value of Am is likely due to the extraction of iron; normally oxalic acid would be added to the feed to repress the extraction of Fe, Zr and many other non-TRU metals. For the SST waste, the TRU separation was initially performed with tracer levels of both $^{241}$Am and $^{238}$Pu and a lanthanide-to-plutonium (Ln/Pu) ratio on the order of $10^8$. For these tests with the SST simulant, $K_d$ was 3 for plutonium in 0.75M CMPO/TBP and 200 for americium in 1M CMPO/TBP coating. The plutonium examples were modified by adding sufficient plutonium to achieve a Ln/Pu ratio of about 300 (the expected Ln/Pu ratio in SST waste); much larger $K_d$ values for plutonium were achieved ($K_d$=2400).

TABLE 5

$K_d$ Measurements for Various Simulant/Tracer Solutions

| [CMPO] (M) | Simulant Solution | $K_d$ | Ln/Pu |
|---|---|---|---|
| 0.75 | 241 Am-PFP | 1.05 E + 02 | * |
| 0.75 | 238 Pu-PFP | 4.94 E + 03 | * |
| 0.75 | Pu-SST | 3.00 E + 00 | 1.0 E08 |
| 1 | 238 Pu-PFP | 3.32 E + 03 | * |
| 1 | 238 Pu-PFP | 1.55 E + 03 | * |
| 1 | 241 Am-PFP | 2.08 E + 02 | * |
| 1.2 | Pu-SST | 2.43 E + 03 | 3.0 E02 |

*negligible Ln concentration

As the particles are reused, they are exposed to additional doses of radioactivity from the TRU elements. An ANL $^{60}$Co source was used to examine the effects of low (10 cycles of use), medium (100 cycles) and high (1000 cycles) gamma dose rates. By monitoring the $K_d$ measurements, particle damage, and efficiency of the magnetic separation stage, the robustness of the process under actual waste conditions is determined.

The degradation of extraction efficiency is affected by both the contacts with nitric acid and radiation dose. Since high dose measurements have longer contact times in acid solutions, it is difficult, with the limited data available, to determine how much of the degradation of particles is due solely to the gamma irradiation, and how much is due to the magnetite dissolution.

The separation of the magnetic particles from solution has been achieved efficiently using commercially available rare earth magnets, complete separation was usually achieved within minutes regardless of particle size. Settling problems due to particles without the magnetite core were confirmed by TEM studies and particles required pretreatment to minimize this effect.

Figure 5:
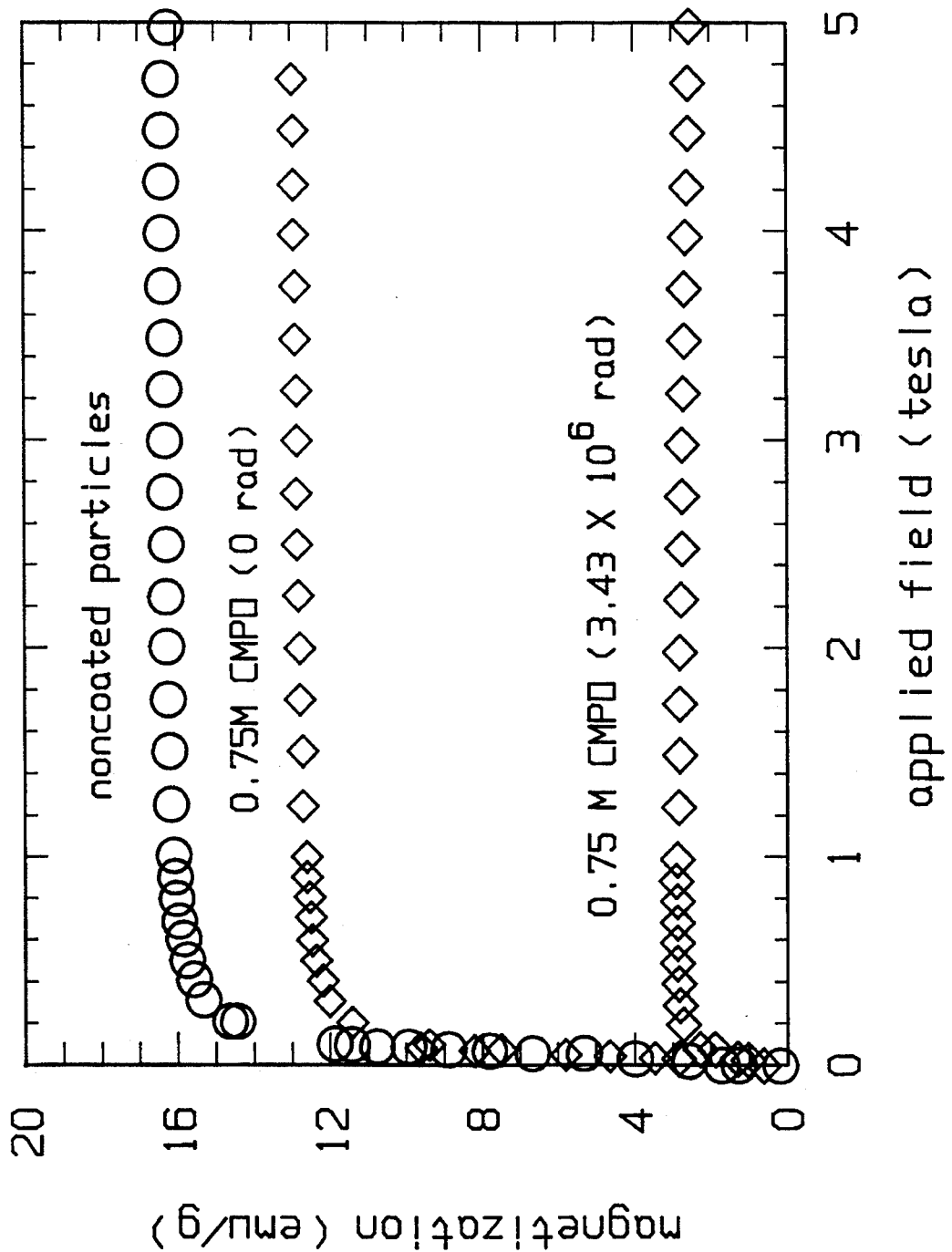
FIG. 5 is a graphical representation of $^{60}$Co irradiation effects on the magnetic properties of the magnetic particles of the invention.

The recovery of the particles depends on their magnetic properties such that any variation in the particles magnetic nature can effect the separation stage. The only condition that can strongly affect the magnetic properties is irradiation from TRU and other tank components. In order to quantify and determine the robustness of separation, magnetization measurements using a Superconducting Quatum Interference Device (SQUID) magnetometer was performed to determine the degradation of the magnetic particles by $^{60}$Co gamma irradiation. FIG. 5 shows a saturation in the magnetization of 1 Tesla for all particles tested. The variation of the magnitude of the magnetization was attributed to lack of accounting for the CMPO/TBP mass on the particles. The important feature of FIG. 5 is the magnitude of the applied magnetic field in which the magnetization saturates, showing that the effects of gamma irradiation are negligible on the magnetic properties and thus, on the magnetic separation stage.

The inventive process has demonstrated the ability to separate and strip TRU elements from acidic media. This compact process could be applied where capital and/or installation space for complex ion-exchange and/or solvent extraction equipment is limited. The preliminary results of the $K_d$ measurements, magnetic characterization, and TEM studies indicate that the inventive process is a significant tool for treatment of radioactive waste.

Although described with respect to transuranics, the inventive process is applicable to removal of a wide variety of metals by loading solvents or ion exchange media on magnetic particles and then contacting the particles with the metal to be separated and thereafter magnetically separating the particles, all as previously disclosed. Table 6 sets forth a variety of metals along with solvent extraction compounds or ion exchange media which may be absorbed by a magnetic particle which includes magnetite ($Fe_3O_4$) or other magnetic material.

TABLE 6

| Metal | Solvent Extraction Reagent | Ion Exchange Material |
|---|---|---|
| Pt | vic-dioximes | AMBELITE IR-100 DOWEX-50 DOWEX-1 DOWEX-1 |
| Pd | nitrosophenols and nitrosophthols Formazans | |
| Pb | diethyldithiocarbamate diketones | AMBELITE IR-120 |
| Al | DEPHA nitrosarylhydroxylamines | |
| Cd | diethyldithiocarbamate nitrosoarylhydroxylamines | Diphonix |
| Ag | Formazans hydroxylquinoline diketonates | |
| Au | thiocrown ethers dimethylanimobernzalrhodanine | |
| Tl | crown ethers dithizonates | DOWEX-1 |
| Hg | tertiary amine diethyldithiocarbamate nitrosoarylhydroxylamines | DOWEX-50 |
| Ga | nitrosoarylhydroxylamines | |
| In | nitrosoarylhydroxylamines | DOWEX-50 DOWEX-1 |
| Zn | tertiary amine Kelex 100 DEHPA | |
| Cs | resorcinol crown ethers cobalt dicalbollide | silicotitanates |
| Ti | nitrosoarylhydroxylamines | AMBELITE IR-120 ZEOZARB-225 |
| Tc | quaternary amercium salts polyethylene glycols | |
| Co | Kelex 100 (Naphthenic acid) carboxylic acids Versatic 911 (Carboxylic acid) DEHPA TBP tertiary amine (TIOA) | |
| Ni | tertiary amine (e.g. TIOA) LIX 64N Kelex 100 (Naphthenic acid) carboxylic acids Versatic 911 (Carboxylic acid) DEHPA | |
| Cu | tertiary amine (e.g. TIOA) LIX 64N Kelex 100 (Naphthenic acid) carboxylic acids TBP nitrosoarylhydroxylamines | |
| Zr | nitrosoarylhydroxylamines dibutyl phosphoric acid (DBPA) | DOWEX-50 |
| Hf | thenoyltrifluoroacetone thiocyanate | DOWEX-50 |
| Ta | MIBK nitrosoarylhydroxylamines | DOWEX-1 |
| Be | DEHPA | |
| Bi | crown ethers nitrosoarylhydroxylamines | WOLFATIT-P |

TABLE 6-continued

| Metal | Solvent Extraction Reagent | Ion Exchange Material |
|---|---|---|
| Rh | crown ethers vic-dioximes | |
| Nb | MIBK vic-dioximes | DOWEX-1 |
| Ba | crown ethers | DOWEX-50 |
| Fe | acetylacetone TBP nitrosoarylhydroxylamines | |
| Mo | tertiary amine quaternary amine nitrosoarylhydroxylamines | AMBELITE IRA-400 |
| Cr | quaternary ammonium salt (e.g. tetraoctylamminoum chloride) | |
| V | tertiary amine DEHPA nitrosoarylhydroxylamines | |
| Mg | nitrosoarylhydroxylamines | |
| Mn | nitrosoarylhydroxylamines quaternary ammonium salt | |
| W | tertiary amine | |
| U | tertiary amine DEHPA TOPA nitrosophenols and nitrosophthols | AMBELITE IRA-400 DOWEX A-1 |
| Th | diketones nitrosoarylhydroxylamines | AMBELITE IR-120 |
| Sb | nitrosoarylhydroxylamines | |
| Lanthanides Y, La | Versatic 911 (Carboxylic acid) DEHPA, CMPO/TBP | DOWEX-50 AMBELITE IR-1 |
| transuranic | CMPO/TBP | |

LIX 65N = Hydrroxybenzohexone omine
Kelex 100 = substituted hydroxyquinoline
DEPHA bis di(-2-ethylhexyl) phosphoric acid
TIOA = trioctyl phosphine oxide
MIBK = methyl isobutyl ketone Below in Table 7 is a listing of ion exchange resins and chemical formulas therefor useful in the present invention. Other ion exchange resins may be used, and it is within the skill of the art to substitute resins or solvents in the invention process.

TABLE 7

| Ion Exchange Resin | Chemical Constituent |
|---|---|
| Amberlite IR-1 | Sulphonated phenolic |
| Amberlite IR-100 | Sulphonated phenolic |
| Amberlite IR-120 | Nuclear sulphonic (styrene base) |
| DOWEX-50 | Nuclear sulphonic (styrene base) |
| WOLFATIT F | Sulphonated phenolic |
| ZEOKARB-225 | Nuclear sulphonic (styrene base) |
| DOWEX-1 | Tertiary amine |
| AMBERLITE IRA-400 | Quarternary strong base (styrene) |
| DOWEX A-1 | Anion exchange amine |

For instance, magnetic particles other than magnetite may be used, such as various commercially available rare earth particles coated with a variety of polymer coatings, all well within the skill of the art.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for selectively removing metal values from a mixture containing same, comprising contacting a magnetic particle with a liquid solvent which selectively dissolves the metal values to absorb the liquid solvent onto the magnetic particle, contacting the solvent-containing magnetic particles with a mixture containing the metal values to transfer metal values into the solvent carried by the magnetic particles, said magnetic particles being present in the mixture in an amount not greater than about 1% by weight, and magnetically separating the magnetic particles.

2. The process of claim 1, wherein said metal values are transuranics and said liquid solvent is a solution of CMPO.

3. The process of claim 2, wherein the CMPO is dissolved in TBP.

4. The process of claim 3, wherein the concentration of CMPO in TBP is in the range of from about 0.5M to about 1.5M.

5. The process of claim 4, wherein the CMPO dissolved in TBP is diluted in a suitable organic diluent and contacted with magnetic particles for a time sufficient to leave a CMPO coating having a thickness in the range of from about 0.5 micron to about 1.5 microns after the particles are dried.

6. The process of claim 5, wherein the suitable organic diluent is an alcohol or hexane.

7. The process of claim 6, wherein the alcohol is a long chain alcohol.

8. The process of claim 1, wherein the particles are charcoal and magnetite.

9. The process of claim 1, wherein the metal values are one or more of Pd, Al, Ag, Au, Ga, Zn, Tc, Co, Ni, Cu, Be, Rh, Fe, Cr, V, Mg, Mn, W, Sb, and the transuranics.

10. The process of claim 1, wherein the metal values are one or more of Pt, Pd, Pb, Al, Cd, Ag, Au, Tl, Hg, Ga, In, Zn, Cs, Sr, Ti, Tc, Co, Ni, Cu, Zr, Hf, Ta, Be, Bi, Rh, Nb, Ba, Fe, Mo, Cr, V, Mg, Mn, W, U, Th, Sb, Y, La and the lanthanides.

11. The process of claim 1, and further comprising stripping the metal values from the particles by dissolving the liquid solvent and metal values on the particles by contacting the particles with a volatile water-immiscible diluent.

12. The process of claim 1, and further comprising stripping the metal values from the particle by dissolving the solvent and metal values on the particles by contacting the particles with an aqueous solution.

13. A process for selectively removing metal values from a mixture containing same, comprising contacting a magnetic particle with a liquid solvent which selectively dissolves the metal values to absorb the liquid solvent onto the magnetic particle or an ion exchange resin absorbed onto a magnetic particle, or a combination of a solvent and ion exchange resin, contacting the solvent-containing or ion exchange resin containing magnetic particles with a mixture containing the metal values to transfer metal values into the solvent or ion exchange resin carried by the magnetic particles, said magnetic particles being present in an amount not greater than about 1% by weight, and magnetically separating the magnetic particles.

14. The process of claim 13, wherein said metal values are one or more of Pt, Pd, Pb, Al, Cd, Ag, Au, Tl, Hg, Ga, In, Zn, Cs, Sr, Ti, Tc, Co, Ni, Cu, Zr, Hf, Ta, Be, Bi, Rh, Nb, Ba, Fe, Mo, Cr, V, Mg, Mn, W, U, Th, Sb, Y, La and the lanthanides.

15. The process of claim 13, wherein the metal is one or more of pt, Pb, Cd, Tl, Hg, In, Cs, Sr, Ti, Zr, Hf, Ta, Bi, Nb, Ba, Mo, U, Th, the lanthanides, and Y and the magnetic particles carry an ion exchange resin.

16. The process of claim 13, wherein some of the magnetic particles carry a solvent.

17. The process of claim 13, and further comprising stripping the metal values from the particles by dissolving the liquid solvent and metal values on the particles by contacting the particles with a volatile water-immiscible diluent.

18. The process of claim 13 and further comprising stripping the metal values from the particle by dissolving the solvent and metal values on the particles by contacting the particles with an aqueous solution.

19. A process for selectively removing metal values from a mixture containing same, comprising contacting a magnetic particle with a liquid solvent which selectively dissolves the metal values to absorb the liquid solvent onto the magnetic particle or an ion exchange resin absorbed onto a magnetic particle, or a combination of a solvent and ion exchange resin, contacting the solvent-containing or ion exchange resin containing magnetic particles with a mixture containing the metal values to transfer metal values into the solvent or ion exchange resin carried by the magnetic particles, said magnetic particles being present in the mixture in an amount not greater than about 1% by weight, magnetically separating the magnetic particles, and stripping the metal values from the magnetic particles by contacting the magnetic particles with a stripping solution, the volume of the stripping solution being substantially less than the volume of solution carrying the metal values.

20. The process of claim 19, wherein after the metal values are separated from the stripping solutions, the magnetic particles are introduced into the stripping solution to absorb thereon the solvent or the ion exchange resin or the combination of a solvent and ion exchange resin, and thereafter evaporating the stripping solution.

* * * * *